(12) United States Patent
Miyazaki et al.

(10) Patent No.: US 7,700,009 B2
(45) Date of Patent: Apr. 20, 2010

(54) METHOD FOR PRODUCING POSITIVE ELECTRODE ACTIVE MATERIAL OF NON-AQUEOUS ELECTROLYTE SECONDARY CELL

(75) Inventors: Shinya Miyazaki, Osaka (JP); Tatsuyuki Kuwahara, Osaka (JP)

(73) Assignee: Sanyo Electric Co., Ltd., Moriguchi-shi (JP)

( * ) Notice: Subject to any disclaimer, the term of this patent is extended or adjusted under 35 U.S.C. 154(b) by 0 days.

(21) Appl. No.: 12/038,508

(22) Filed: Feb. 27, 2008

(65) Prior Publication Data

US 2008/0203363 A1 Aug. 28, 2008

(30) Foreign Application Priority Data

Feb. 27, 2007 (JP) ............................. 2007-047638

(51) Int. Cl.
*H01B 1/00* (2006.01)
(52) U.S. Cl. .................. 252/521.2; 427/79; 429/231.1; 429/232
(58) Field of Classification Search ............ 252/521.2, 252/500; 427/126.1, 79; 429/212, 221, 232, 429/236, 231.1
See application file for complete search history.

(56) References Cited

U.S. PATENT DOCUMENTS

| | | | |
|---|---|---|---|
| 6,344,294 B1 * | 2/2002 | Torata et al. ................. | 429/223 |
| 6,379,644 B2 * | 4/2002 | Torata et al. ............. | 423/594.4 |
| 6,720,113 B2 * | 4/2004 | Goto et al. ............. | 429/231.95 |
| 2002/0004169 A1 | 1/2002 | Yamada et al. | |
| 2003/0124423 A1 * | 7/2003 | Sasaki et al. ................. | 429/221 |
| 2003/0211235 A1 * | 11/2003 | Suh et al. ................. | 427/126.1 |
| 2003/0215717 A1 * | 11/2003 | Miyaki ........................ | 429/232 |
| 2004/0096743 A1 | 5/2004 | Okae et al. | |
| 2004/0151980 A1 * | 8/2004 | Miyaki ........................ | 429/217 |
| 2004/0253518 A1 * | 12/2004 | Hosoya et al. ............. | 429/232 |
| 2005/0048371 A1 * | 3/2005 | Nagayama et al. .......... | 429/236 |
| 2005/0196673 A1 | 9/2005 | Biensan et al. | |
| 2006/0099495 A1 | 5/2006 | Suzuki et al. | |
| 2006/0153972 A1 * | 7/2006 | Hirokawa .................... | 427/79 |
| 2006/0194114 A1 * | 8/2006 | Saito .......................... | 429/232 |
| 2006/0216601 A1 * | 9/2006 | Komiyama et al. ........ | 429/231.1 |
| 2007/0212611 A1 * | 9/2007 | Nishijima et al. ............ | 429/232 |
| 2008/0096109 A1 * | 4/2008 | Fukumine et al. ............ | 429/212 |
| 2009/0029255 A1 * | 1/2009 | Ohmori .................... | 429/231.1 |
| 2009/0095942 A1 * | 4/2009 | Yamaguchi et al. ......... | 252/500 |

FOREIGN PATENT DOCUMENTS

| | | |
|---|---|---|
| JP | 2001-307730 A | 11/2001 |
| JP | 2002-075368 A | 3/2002 |
| JP | 2003-292308 A | 10/2003 |
| JP | 2004-87299 A | 3/2004 |
| JP | 2005-123107 A | 5/2005 |
| JP | 2005-183384 A | 7/2005 |
| JP | 2005-276475 A | 10/2005 |
| JP | 2006-134770 A | 5/2006 |
| JP | 4061586 B2 | 1/2008 |

\* cited by examiner

*Primary Examiner*—Mark Kopec
*Assistant Examiner*—Khanh Tuan Nguyen
(74) *Attorney, Agent, or Firm*—Westerman, Hattori, Daniels & Adrian, LLP

(57) ABSTRACT

A method for producing a positive electrode active material that realizes a non-aqueous electrolyte secondary cell having high discharge capacity and excellent high temperature preservation characteristic is provided. The method includes: an underwater kneading step of kneading lithium nickel composite oxide ($Li_xNi_{1-y}M_yO_z$, $0.9 < x \leq 1.1$, $0 \leq y \leq 0.7$, $1.9 \leq z \leq 2.1$, M including at least one selected from Al, Co, and Mn), lithium iron phosphorus composite oxide ($LiFePO_4$), a conductive carbon source, and water; after the underwater kneading step, a cleaning step of removing the water from the mixture after the underwater kneading step; and after the cleaning step, a baking step of baking the mixture in a reduced atmosphere at 200 to 800° C.

11 Claims, No Drawings

METHOD FOR PRODUCING POSITIVE ELECTRODE ACTIVE MATERIAL OF NON-AQUEOUS ELECTROLYTE SECONDARY CELL

BACKGROUND OF THE INVENTION

1) Field of the Invention

The present invention relates to an improvement in non-aqueous electrolyte secondary cells.

2) Description of the Related Art

Non-aqueous electrolyte secondary cells, for their high energy density and high capacity, are widely used as power sources for mobile phones. In recent years, there has been rapid enhancement of functionality of mobile information terminals such as mobile phones and laptop computers, resulting in a need for cells with higher capacity.

While lithium cobalt oxide has been conventionally used as a positive electrode active material for non-aqueous electrolyte secondary cells, use of lithium nickel composite oxide instead of lithium cobalt oxide provides higher discharge capacity than the case of lithium cobalt oxide. Thus, lithium nickel composite oxide is increasingly expected to be used as a positive electrode active material for non-aqueous electrolyte secondary cells.

Lithium nickel composite oxide, on the other hand, has the property of intensely discharging oxygen when charged to high temperatures, posing the problem of a lack of safety. Further, for lithium nickel composite oxide of high quality to be obtained, synthesis under Li-rich conditions is effective; however, the alkaline component tends to remain on the surface of the lithium nickel composite oxide during synthesis thereof under Li-rich conditions, thus posing the problem of degraded high-temperature preservation characteristic.

Examples of the prior arts related to non-aqueous electrolyte secondary cells include Japanese Patent Application Publication Nos. 2001-307730 (patent document 1), 2002-75368 (patent document 2), 2003-292308 (patent document 3), 2004-87299 (patent document 4), 2005-123107 (patent document 5), 2005-183384 (patent document 6), 2005-276475 (patent document 7), and 2006-134770 (patent document 8).

Patent document 1 discloses use of, as a positive electrode active material, a composite of a first lithium compound represented by $LiMPO_4$ (M including Fe) and a second lithium compound having a potential rarer than that of the first lithium compound. This technique is claimed to realize a cell having excellent charge/discharge characteristics.

This technique, however, poses the problem of insufficient high-temperature preservation characteristic.

Patent document 2 discloses covering the surfaces of $LiNi_{1-x}M_xO_2$ particles (M being at least one selected from Al, B, and Co) with $LiFePO_4$ fine particles. This technique is claimed to realize a cell provided with both characteristics of $LiNi_{1-x}M_xO_2$, which has high energy density, and $LiFePO_4$, which has limited degradation of capacity during charging.

This technique, however, poses the problem of insufficient high-temperature preservation characteristic.

Patent document 3 discloses covering the surfaces of $LiFePO_4$ particles with a conductive carbon material while restricting the average particle diameter of the $LiFePO_4$-carbon composite to 0.5 µm or less. This technique is claimed to improve discharge capacity.

However, the $LiFePO_4$ particles have low fillability which makes high density filling difficult, thus failing to improve discharge capacity sufficiently.

Patent document 4 discloses a positive electrode active material made of lithium nickel oxide particles, the surfaces of which are covered with $LiFePO_4$ having an olivine crystal structure. This technique is claimed to realize a cell provided with advantages of the lithium nickel oxide and those of the olivine compound.

This technique, however, poses the problem of insufficient high-temperature preservation characteristic.

Patent document 5 discloses use of, as a positive electrode active material, a composite of olivine lithium phosphate represented by $LiFePO_4$ and a carbon material. This technique is claimed to realize a cell capable of rapid charging and having high capacity.

However, the $LiFePO_4$ particles have low fillability which makes high density filling difficult, thus failing to improve discharge capacity sufficiently.

Patent document 6 discloses use of, as a positive electrode active material, a mixture of lithium nickel composite oxide and $LiFePO_4$. This technique is claimed to realize a cell excellent in safety during overcharge.

This technique, however, poses the problem of insufficient high-temperature preservation characteristic.

Patent document 7 discloses use of, as a positive electrode active material, lithium iron phosphorus composite oxide. This technique is claimed to realize a cell having high discharge capacity and excellent charge/discharge cycle characteristics.

However, the lithium iron phosphorus composite oxide particles have low fillability which makes high density filling difficult, thus failing to improve discharge capacity sufficiently.

Patent document 8 discloses use of a positive electrode of a multi-layer structure composed of a first active material layer of $LiNiO_2$ and a second active material layer of $LiFePO_4$, laminated with one another. This technique is claimed to realize a cell excellent in continuous charging characteristic and high-temperature preservation characteristic.

This technique, however, still poses the problem of insufficient high-temperature preservation characteristic.

SUMMARY OF THE INVENTION

The present invention has been accomplished in order to solve the above problems, and it is an object of the present invention to provide a non-aqueous electrolyte secondary cell having high capacity and excellent high-temperature preservation characteristic.

(1) In order to accomplish the above-mentioned object, a method for producing a positive electrode active material for a non-aqueous electrolyte secondary cell according to the present invention comprises: an underwater kneading step of kneading lithium nickel composite oxide ($Li_xNi_{1-y}M_yO_z$, $0.9<x\leq1.1$, $0\leq y\leq0.7$, $1.9\leq z\leq2.1$, M including at least one selected from Al, Co, and Mn), lithium iron phosphorus composite oxide ($LiFePO_4$), a conductive carbon source, and water; a cleaning step of removing the water from the mixture after the underwater kneading step; and a baking step of baking the mixture in a reduced atmosphere at 200 to 800° C.

In this configuration, containing lithium nickel composite oxide in the positive electrode active material increases discharge capacity. Also the lithium iron phosphorus composite oxide and the conductive carbon source contained in the positive electrode active material serve to enhance the stability of the lithium nickel composite oxide while preserved in a charged, high temperature state, thereby improving the high-temperature preservation characteristic. Further, the cleaning step removes, together with water, the alkaline component remaining on the surface of the lithium nickel composite oxide when synthesized, thereby eliminating adverse effects by the alkaline component. These effects collaborate to drastically improve the high-temperature preservation characteristic.

Incidentally, lithium iron phosphorus oxide has low conductivity, which poses the problem of poor load characteristic. In view of this, in the above configuration, the underwater kneading step of kneading in water the lithium iron phosphorus composite oxide and a conductive carbon source leads to form a coating layer of the conductive carbon over the surface of the lithium iron phosphorus composite oxide. Then the baking step carbonizes the conductive carbon source to form a carbon-coating layer with preferable conductivity over the lithium iron phosphorus composite oxide. The carbon coating layer develops the conductivity of the lithium iron phosphorus composite oxide, thereby preventing reduction in load characteristic.

In the baking step, if the baking temperature is significantly low, a carbon coating layer of good quality cannot be obtained, while an excessively high baking temperature causes recrystallization of the lithium nickel composite oxide or the lithium iron phosphorus oxide due to the baking. In view of this, the baking temperature is specified between 200° C. and 800° C.

In view of capacity, safety, and the like, a heterogeneous metal added to the lithium nickel composite oxide is preferably at least one selected from the group consisting of Al, Co, and Mn. In the above chemical formula, x, y, and z are therefore as specified above.

In the above configuration, the lithium iron phosphorus composite oxide may be 1 to 20 mass % relative to the lithium nickel composite oxide.

If the content ratio of the lithium iron phosphorus composite oxide is significantly low, the effect of enhancing the stability of the lithium nickel composite oxide during high-temperature charge preservation cannot be obtained sufficiently, while an excessively high content ratio of the lithium iron phosphorus composite oxide disables the carbon layer to sufficiently improve the low conductivity of the lithium iron phosphorus composite oxide, resulting in degraded load characteristic. In view of this, the content of the lithium iron phosphorus composite oxide is specified within the above range (1 to 20 mass %).

In the above configuration, the conductive carbon source may be 0.01 to 5.0 mass % relative to the lithium nickel composite oxide.

If the content ratio of the conductive carbon source is significantly low, the low conductivity of the lithium iron phosphorus composite oxide cannot be improved sufficiently, resulting in degraded load characteristic, while an excessively high content ratio of the conductive carbon source makes excessively dense the carbon coating layer on the surface of the positive electrode active material, making it impossible to sufficiently obtain the effect of enhancing the stability of the lithium nickel composite oxide during high-temperature charge preservation by the lithium iron phosphorus composite oxide. In view of this, the content of the conductive carbon source is specified within the above range (0.01 to 5.0 mass %).

It is noted that the content (content ratio) of each of the lithium iron phosphorus composite oxide and the conductive carbon source is in terms of mass percentage of the lithium iron phosphorus composite oxide and the conductive carbon source relative to the mass of the lithium nickel composite oxide, which is assumed 100.

A suitable conductive carbon source is a saccharide and/or a saccharide ester. Specifically, at least one compound selected from the group consisting of glucose, fructose, xylose, sucrose, cellulose, and esters thereof is suitable.

(2) In order to accomplish the above-mentioned object, a method for producing a non-aqueous electrolyte secondary cell according to the present invention includes the first steps of: preparing a positive electrode active material by the method for producing a positive electrode active material for a non-aqueous electrolyte secondary cell according to any one of claims 1 to 10; and a step of applying a positive electrode active material slurry containing the positive electrode active material to a current collector.

This configuration provides the significantly advantageous effect of providing a non-aqueous electrolyte secondary cell having high discharge capacity and excellent high temperature preservation characteristic.

DESCRIPTION OF THE PREFERRED EMBODIMENTS

The preferred embodiments of the present invention will be described with reference to examples. It will be understood that the present invention will not be limited by the embodiments below; modifications are possible without departing from the scope of the present invention.

Example 1

(Preparation of the Positive Electrode)

Nickel, cobalt, and aluminum were co-precipitated thus obtaining nickel-cobalt-aluminum hydroxide. To this hydroxide, lithium hydroxide was added, followed by baking at 700° C., thus obtaining lithium nickel composite oxide ($LiNi_{0.8}Co_{0.15}Al_{0.05}O_2$).

Iron sulfate, phosphoric acid, and lithium hydroxide were mixed together and subjected to hydrothermal treatment at 200° C. for 3 hours. The resulting precipitated substance was annealed at 500° C. thus obtaining olivine lithium iron phosphorus composite oxide ($LiFePO_4$).

The element contents of the lithium nickel composite oxide and the olivine lithium iron phosphorus composite oxide were analyzed by ICP (Inductively Coupled Plasma).

(Underwater Kneading Step)

A hundred mass parts of the lithium nickel composite oxide and 5 mass % of the lithium iron phosphorus composite oxide, 3 mass parts of sucrose, and water were mixed together and then kneaded in water.

(Cleaning Step)

After the underwater kneading step, the water was removed, and the lithium nickel composite oxide and the lithium iron phosphorus composite oxide were cleaned.

(Baking Step)

The cleaning step was followed by baking in a reduced atmosphere at 200° C. for 5 hours thus preparing a positive electrode active material.

Ninety mass parts of this positive electrode active material, 5 mass parts of carbon powder as a conducting agent, 5 mass parts of polyvinylidene fluoride (PVDF) as a binding agent, and N-Methyl-2-Pyrrolidone (NMP) were mixed together, thus preparing a positive electrode active material slurry. This positive electrode active material slurry was applied to both surfaces of a positive electrode current collector (20 μm thick) made of an aluminum foil by doctor blading, followed by drying. Then, the positive electrode current collector with the slurry thereon was rolled to a thickness of 160 μm with the use of a compression roller, thus preparing a positive electrode of 55×500 mm.

(Preparation of the Negative Electrode)

Ninety-five mass parts of natural graphite as a negative electrode active material, 5 mass parts of polyvinylidene fluoride (PVDF) as a binding agent, and N-Methyl-2-Pyrrolidone (NMP) were mixed together, thus preparing a negative electrode active material slurry. The negative electrode active material slurry was applied to both surfaces of a negative electrode current collector (18 μm thick) made of copper and dried. Then, the negative electrode current collector with the slurry thereon was rolled to a thickness of 155 μm with the use of a compression roller, thus preparing a negative electrode of 57×500 mm.

The potential of the graphite is 0.1 V on the basis of lithium. The amounts of the active materials filled in the positive electrode and the negative electrode were adjusted such that the charge capacity ratio (negative electrode charge capacity/positive electrode charge capacity) would be 1.1 at the potential of the positive electrode active material (4.3 V on the basis of lithium in this example, while the voltage being 4.2 V), which serves as a design reference.

(Preparation of the Electrode Assembly)

The positive electrode and the negative electrode were wound with a separator made of a polypropylene porous film disposed therebetween, thus preparing an electrode assembly.

(Preparation of the Non-Aqueous Electrolyte)

Ethylene carbonate and diethyl carbonate were mixed together at a volume ratio of 50:50 (25° C.), and then $LiPF_6$ as electrolytic salt was dissolved therein at a rate of 1.0 (mol/liter), thus obtaining a non-aqueous electrolyte.

(Assembly of the Cell)

The electrode assembly was inserted into a cell casing, into which the non-aqueous electrolyte was then injected. The opening of the cell casing was sealed, thus preparing a non-aqueous electrolyte secondary cell according to example 1 having a diameter of 18 mm and a height of 65 mm.

Comparative Example 1

A non-aqueous electrolyte secondary cell according to comparative example 1 was prepared in the same manner as in example 1 except that the cleaning step was not carried out.

Comparative Example 2

A non-aqueous electrolyte secondary cell according to comparative example 2 was prepared in the same manner as in example 1 except that $LiFePO_4$ was not added.

Comparative Example 3

A non-aqueous electrolyte secondary cell according to comparative example 3 was prepared in the same manner as in example 1 except that sucrose was not added.

Comparative Example 4

A non-aqueous electrolyte secondary cell according to comparative example 4 was prepared in the same manner as in example 1 except that instead of the underwater kneading step, the lithium nickel composite oxide, the lithium iron composite phosphorus oxide, and sucrose were kneaded in a dried manner, and that the cleaning step was not carried out.

Comparative Example 5

A non-aqueous electrolyte secondary cell according to comparative example 5 was prepared in the same manner as in example 1 except that the baking step was carried out at 100° C.

[Load Characteristic Test]

The cells were charged at a constant current of 1500 mA to a voltage of 4.2 V, then at a constant voltage of 4.2 V to a current of 30 mA. Then the cells were discharged at a constant current of 1500 mA to a voltage of 2.75 V to measure the discharge capacity of each cell. The cells were again charged under the above conditions and discharged at a constant current of 4500 mA to a voltage of 2.75 V to measure the discharge capacity of each cell. The load characteristic was calculated from the following formula. (This was all carried out at 25° C.) The results are shown in Table 1.

Load Characteristic (%)=4500 mA Discharge Capacity/1500 mA Discharge Capacity×100

[High-Temperature Preservation Test]

The cells were charged at a constant current of 1500 mA to a voltage of 4.2 V, then at a constant voltage of 4.2 V to a current of 30 mA. Then the cells were discharged at a constant current of 1500 mA to a voltage of 2.75 V to measure the discharge capacity of each cell. The cells were again charged under the above conditions. (This was all carried out at 25° C.) Then the cells were preserved at 70° C. for 360 hours. The cells were then discharged at a constant current of 1500 mA to a voltage of 2.75 V at 25° C. to measure the discharge capacity of each cell. The preservation characteristic of each cell was calculated from the following formula. The results are shown in Table 1.

High-Temperature Preservation Characteristic (%)=Discharge Capacity after Preservation/Discharge Capacity before Preservation×100

[Internal Short Circuiting Test]

Five sample cells were prepared from each of example 1 and comparative examples 1 to 5, and charged at a constant current of 1500 mA to a voltage of 4.4 V, then at a constant voltage of 4.4 V to a current of 30 mA. The center of each sample cell was pierced with a nail of 3 mm in diameter. The case with combustion was estimated NG, while the case without combustion was estimated OK.

It is noted that charging to a voltage of 4.4 V means overcharging.

It also should be noted that cells on the market are mounted with protection circuits and the like to prevent the cells from being overcharged, and that the needle piercing, which is an extreme example of internal short circuiting, would never occur in practice.

TABLE 1

| | $LiFePO_4$ content (mass %) | Sucrose content (mass %) | Underwater kneading step | Cleaning step | Baking step | Load characteristic (%) | High-temperature preservation characteristic (%) | Internal short-circuiting test |
|---|---|---|---|---|---|---|---|---|
| Example 1 | 5 | 3 | Conducted | Conducted | 200° C. | 96 | 94 | 0/5 NG |
| Comparative Example 1 | 5 | 3 | Conducted | Not Conducted | 200° C. | 96 | 85 | 0/5 NG |

TABLE 1-continued

|  | LiFePO$_4$ content (mass %) | Sucrose content (mass %) | Underwater kneading step | Cleaning step | Baking step | Load characteristic (%) | High-temperature preservation characteristic (%) | Internal short-circuiting test |
|---|---|---|---|---|---|---|---|---|
| Comparative Example 2 | 0 | 3 | Conducted | Conducted | 200° C. | 96 | 92 | 5/5 NG |
| Comparative Example 3 | 5 | 0 | Conducted | Conducted | 200° C. | 80 | 90 | 0/5 NG |
| Comparative Example 4 | 5 | 3 | Not Conducted | Not Conducted | 200° C. | 95 | 80 | 0/5 NG |
| Comparative Example 5 | 5 | 3 | Conducted | Conducted | 100° C. | 85 | 90 | 0/5 NG |

Table 1 shows that comparative examples 1 and 4, which do not carry out the cleaning step, have high-temperature preservation characteristics of 85% and 80%, respectively, which are significantly degraded values compared with a high-temperature preservation characteristic of 94% for example 1, which carries out the cleaning step.

A possible explanation for the results is as follows. The lithium nickel composite oxide tends to have its alkaline component left during synthesis so that the alkaline component absorbs moisture, resulting in a decrease in high-temperature preservation characteristic. The cleaning step removes the alkaline component off the lithium nickel composite oxide together with water, thereby eliminating this problem.

Table 1 also shows that comparative example 2, which does not contain lithium iron phosphorus composite oxide (LiFePO$_4$), has all of its five sample cells estimated NG in the internal short circuiting test, which is a significantly degraded result compared with 0/5 NG for example 1, which contains lithium iron phosphorus composite oxide.

A possible explanation for the results is as follows. The lithium nickel composite oxide itself has low stability for its crystal structure during overcharge and at high temperature. Thus, when an overcharge and an internal short circuit make the cell temperature abnormally high, oxygen is intensely discharged from the crystal to make the crystal structure unstable, leading to cell combustion. Addition of lithium iron phosphorus composite oxide, which excels in structural stability and thermal stability, and a conductive carbon source, which enhances conductivity, leads to surface protection and stability as well as securing reaction homogenization. Thus, cell combustion is prevented.

Table 1 also shows that comparative example 3, which does not contain sucrose, has a load characteristic of 80%, which is a significantly degraded value compared with 96% for the load characteristic of example 1, which contains sucrose.

A possible explanation for the results is as follows. Lithium iron phosphorus composite oxide has low conductivity and simply adding a conducting agent cannot realize sufficient conductivity, resulting in decrease in load characteristic. When sucrose is added during the underwater kneading step, the sucrose coats the surface of the lithium iron phosphorus composite oxide, and the coating sucrose is carbonized during baking to be rendered a carbon coating layer of good quality on the surface of the lithium iron phosphorus composite oxide, thereby improving conductivity. Thus, the load characteristic is drastically improved.

Table 1 also shows that comparative example 5, in which baking was carried out at 100° C., has a load characteristic of 85%, which is a significantly degraded value compared with 96% for the load characteristic of example 1, in which baking was carried out at 200° C.

A possible explanation for the results is as follows. If the baking temperature is low, sucrose is not carbonized and thus the low conductivity of the lithium iron phosphorus composite oxide, resulting in decrease in load characteristic. In view of this, the baking temperature is preferably 200° C. or higher. If the baking temperature exceeds 800° C., recrystallization of the lithium nickel composite oxide or the lithium iron phosphorus composite oxide may occur. In view of this, the upper limit for the baking temperature is preferably 800° C.

Example 2

A non-aqueous electrolyte secondary cell according to example 2 was prepared in the same manner as in example 1 except that the content of lithium iron phosphorus composite oxide (LiFePO$_4$) was 1.0 mass part.

Example 3

A non-aqueous electrolyte secondary cell according to example 3 was prepared in the same manner as in example 1 except that the content of lithium iron phosphorus composite oxide (LiFePO$_4$) was 20 mass parts.

Example 4

A non-aqueous electrolyte secondary cell according to example 4 was prepared in the same manner as in example 1 except that the content of lithium iron phosphorus composite oxide (LiFePO$_4$) was 30 mass parts.

[Cell Characteristic Test]

The cells according to examples 1 to 4 and comparative example 2 were subjected to the load characteristic test, the high-temperature preservation characteristic test, and the internal short circuiting test. The results are shown in Table 2.

TABLE 2

|  | LiFePO$_4$ content (mass %) | Load characteristic (%) | High-temperature preservation characteristic (%) | Internal short circuiting test |
|---|---|---|---|---|
| Comparative example 2 | 0 | 96 | 92 | 5/5NG |
| Example 2 | 1.0 | 96 | 94 | 0/5NG |
| Example 1 | 5.0 | 96 | 94 | 0/5NG |
| Example 3 | 20 | 95 | 95 | 0/5NG |
| Example 4 | 30 | 91 | 92 | 0/5NG |

Table 2 shows that example 4, which contains 30 mass % lithium iron phosphorus composite oxide (LiFePO$_4$), has a load characteristic of 91%, which is slightly below 95% and 96% for the load characteristic of examples 1 to 3, which contain 1.0 to 20 mass % lithium iron phosphorus composite oxide.

A possible explanation for the results is as follows. If a large amount of lithium iron phosphorus composite oxide (LiFePO$_4$) is contained, the low conductivity of the lithium iron phosphorus composite oxide cannot be improved sufficiently by addition of sucrose, resulting in a slight decrease in load characteristic. In view of this, the content of lithium iron phosphorus composite oxide is 1.0 to 20 mass % relative to lithium nickel composite oxide.

Example 5

A non-aqueous electrolyte secondary cell according to example 5 was prepared in the same manner as in example 1 except that the sucrose content was 0.01 mass part.

Example 6

A non-aqueous electrolyte secondary cell according to example 6 was prepared in the same manner as in example 1 except that the sucrose content was 5.0 mass parts.

Example 7

A non-aqueous electrolyte secondary cell according to example 7 was prepared in the same manner as in example 1 except that the sucrose content was 6.0 mass parts.

[Cell Characteristic Test]

The cells according to examples 1, 5 to 7, and comparative example 3 were subjected to the load characteristic test, the high-temperature preservation characteristic test, and the internal short circuiting test. The results are shown in Table 3.

TABLE 3

| | Sucrose content (mass %) | Load characteristic (%) | High-temperature preservation characteristic (%) | Internal short circuiting test |
|---|---|---|---|---|
| Comparative example 3 | 0 | 80 | 90 | 0/5NG |
| Example 5 | 0.01 | 95 | 94 | 0/5NG |
| Example 1 | 3.0 | 96 | 94 | 0/5NG |
| Example 6 | 5.0 | 96 | 94 | 0/5NG |
| Example 7 | 6.0 | 95 | 92 | 0/5NG |

Table 3 shows that example 7, which contains 6.0 mass % sucrose, has a high-temperature preservation characteristic of 92%, which is slightly below 95% and 96% for examples 5, 1, and 6, which contain sucrose at 0.01 mass %, 3.0, mass %, and 6.0 mass %, respectively.

A possible explanation for the results is as follows. If a large amount of sucrose is contained, the carbonized product of sucrose covers the surface of the lithium iron phosphorus composite oxide ($LiFePO_4$) densely and thus impedes the thermal stability improving effect of the lithium nickel composite oxide, resulting in degraded high-temperature preservation characteristic. In view of this, the content of sucrose (conductive carbon source) is preferable 0.01 to 5.0 mass %.

Example 8

A non-aqueous electrolyte secondary cell according to example 8 was prepared in the same manner as in example 1 except that glucose was used instead of sucrose.

Example 9

A non-aqueous electrolyte secondary cell according to example 9 was prepared in the same manner as in example 1 except that fructose was used instead of sucrose.

Example 10

A non-aqueous electrolyte secondary cell according to example 10 was prepared in the same manner as in example 1 except that xylose was used instead of sucrose.

Example 11

A non-aqueous electrolyte secondary cell according to example 11 was prepared in the same manner as in example 1 except that carboxymethyl cellulose was used instead of sucrose.

[Cell Characteristic Test]

The cells according to examples 1, 8 to 11 were subjected to the load characteristic test, the high-temperature preservation characteristic test, and the internal short circuiting test. The results are shown in Table 4.

TABLE 4

| | Conductive carbon source | Load characteristic (%) | High-temperature preservation characteristic (%) | Internal short circuiting test |
|---|---|---|---|---|
| Example 1 | sucrose | 96 | 94 | 0/5NG |
| Example 8 | glucose | 96 | 94 | 0/5NG |
| Example 9 | fructose | 96 | 94 | 0/5NG |
| Example 10 | xylose | 96 | 94 | 0/5NG |
| Example 11 | carboxymethyl cellulose | 97 | 94 | 0/5NG |

Table 4 shows that use of, as the conductive carbon source, saccharide (including sucrose, glucose, fructose, xylose) and saccharide ester (carboxymethyl cellulose) provides good performance.

(Supplementary Remarks)

The methods for preparing lithium nickel composite oxide and lithium iron phosphorus composite oxide are not limited to those used in the above examples.

While in the above examples the cleaning step includes removing water used in the underwater kneading step, it is also possible to clean the lithium nickel composite oxide and the lithium iron phosphorus composite oxide by flowing water.

INDUSTRIAL APPLICABILITY

As has been described above, the present invention realizes a non-aqueous electrolyte secondary cell having high capacity and excellent high-temperature preservation characteristic. Thus, the industrial applicability of the present invention is considerable.

What is claimed is:

1. A method for producing a positive electrode active material for a non-aqueous electrolyte secondary cell, the method comprising:
    an underwater kneading step of kneading lithium nickel composite oxide ($Li_xNi_{1-y}M_yO_z$, $0.9<x\leq1.1$, $0\leq y\leq0.7$, $1.9\leq z\leq2.1$, M including at least one selected from Al, Co, and Mn), lithium iron phosphorus composite oxide ($LiFePO_4$), a conductive carbon source, and water;
    a cleaning step of removing the water and an alkaline component remaining on the surface of the lithium nickel composite oxide from the mixture after the underwater kneading step; and
    a baking step of baking the mixture in a reduced atmosphere at 200 to 800° C.

2. The method according to claim 1, wherein the lithium iron phosphorus composite oxide is 1 to 20 mass % relative to the lithium nickel composite oxide.

3. The method according to claim 2, wherein the conductive carbon source is 0.01 to 5.0 mass % relative to the lithium nickel composite oxide.

4. The method according to claim 3, wherein the conductive carbon source is a saccharide and/or a saccharide ester.

5. The method according to claim 4, wherein the saccharide and/or the saccharide ester is at least one compound selected from the group consisting of glucose, fructose, xylose, sucrose, cellulose, and esters thereof.

6. The method according to claim 1, wherein the conductive carbon source is 0.01 to 5.0 mass % relative to the lithium nickel composite oxide.

7. The method according to claim 6, wherein the conductive carbon source is a saccharide and/or a saccharide ester.

8. The method according to claim 7, wherein the saccharide and/or the saccharide ester is at least one compound selected from the group consisting of glucose, fructose, xylose, sucrose, cellulose, and esters thereof.

9. The method according to claim 1, wherein the conductive carbon source is a saccharide and/or a saccharide ester.

10. The method according to claim 9, wherein the saccharide and/or the saccharide ester is at least one compound selected from the group consisting of glucose, fructose, xylose, sucrose, cellulose, and esters thereof.

11. A method for producing a non-aqueous electrolyte secondary cell, the method comprising the steps of:
   preparing a positive electrode active material by the method for producing a positive electrode active material for a non-aqueous electrolyte secondary cell according to any one of claims 1 to 10; and
   applying a positive electrode active material slurry containing the positive electrode active material to a current collector.

* * * * *